United States Patent
Schwark et al.

(10) Patent No.: US 8,979,131 B2
(45) Date of Patent: Mar. 17, 2015

(54) FUEL TANK MOUNTING

(71) Applicant: Caterpillar Inc., Peoria, IL (US)

(72) Inventors: Travis Schwark, Shorewood, IL (US); James L. Greene, Bristol, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/923,626

(22) Filed: Jun. 21, 2013

(65) Prior Publication Data

US 2014/0015239 A1 Jan. 16, 2014

Related U.S. Application Data

(60) Provisional application No. 61/671,843, filed on Jul. 16, 2012.

(51) Int. Cl.
| | |
|---|---|
| *B60K 15/067* | (2006.01) |
| *B60K 15/07* | (2006.01) |
| *B21D 53/88* | (2006.01) |
| *B60K 15/063* | (2006.01) |

(52) U.S. Cl.
CPC ............... *B60K 15/07* (2013.01); *B21D 53/88* (2013.01); *B60K 15/067* (2013.01); *B60K 2015/0638* (2013.01); *B60Y 2200/415* (2013.01)
USPC .......................................... 280/834; 248/635

(58) Field of Classification Search
CPC ............................... B60K 15/07; B60K 15/067
USPC ..................... 280/834, 835; 248/635
See application file for complete search history.

(56) References Cited

U.S. PATENT DOCUMENTS

| | | | |
|---|---|---|---|
| 2,962,279 A * | 11/1960 | Wroby | 267/293 |
| 4,223,899 A * | 9/1980 | Krieger | 280/834 |
| 5,791,431 A * | 8/1998 | Asao et al. | 180/311 |
| 6,910,716 B2 * | 6/2005 | Kurayoshi et al. | 280/835 |
| 7,040,661 B2 | 5/2006 | Choi | |
| 7,252,170 B2 * | 8/2007 | Miyakozawa et al. | 180/219 |
| 8,511,656 B2 * | 8/2013 | Yahata | 267/141.4 |
| 2007/0272460 A1 * | 11/2007 | Riniker et al. | 180/68.4 |
| 2012/0298832 A1 * | 11/2012 | Kobori | 248/635 |

FOREIGN PATENT DOCUMENTS

JP 2006027316 2/2006

* cited by examiner

*Primary Examiner* — Kevin Hurley
(74) *Attorney, Agent, or Firm* — John P. Wappel; Leydig, Voit & Mayer, Ltd.

(57) ABSTRACT

A fuel tank mounting system for a motor vehicle including an end plate, a sleeve, a fuel tank bracket, and a pin for coupling the fuel tank to a frame of the motor vehicle while allowing the fuel tank bracket to move axially with respect to the pin and to rotate about the pin to reduce stress on at least one fuel tank mount used to couple the fuel tank to the frame.

20 Claims, 4 Drawing Sheets

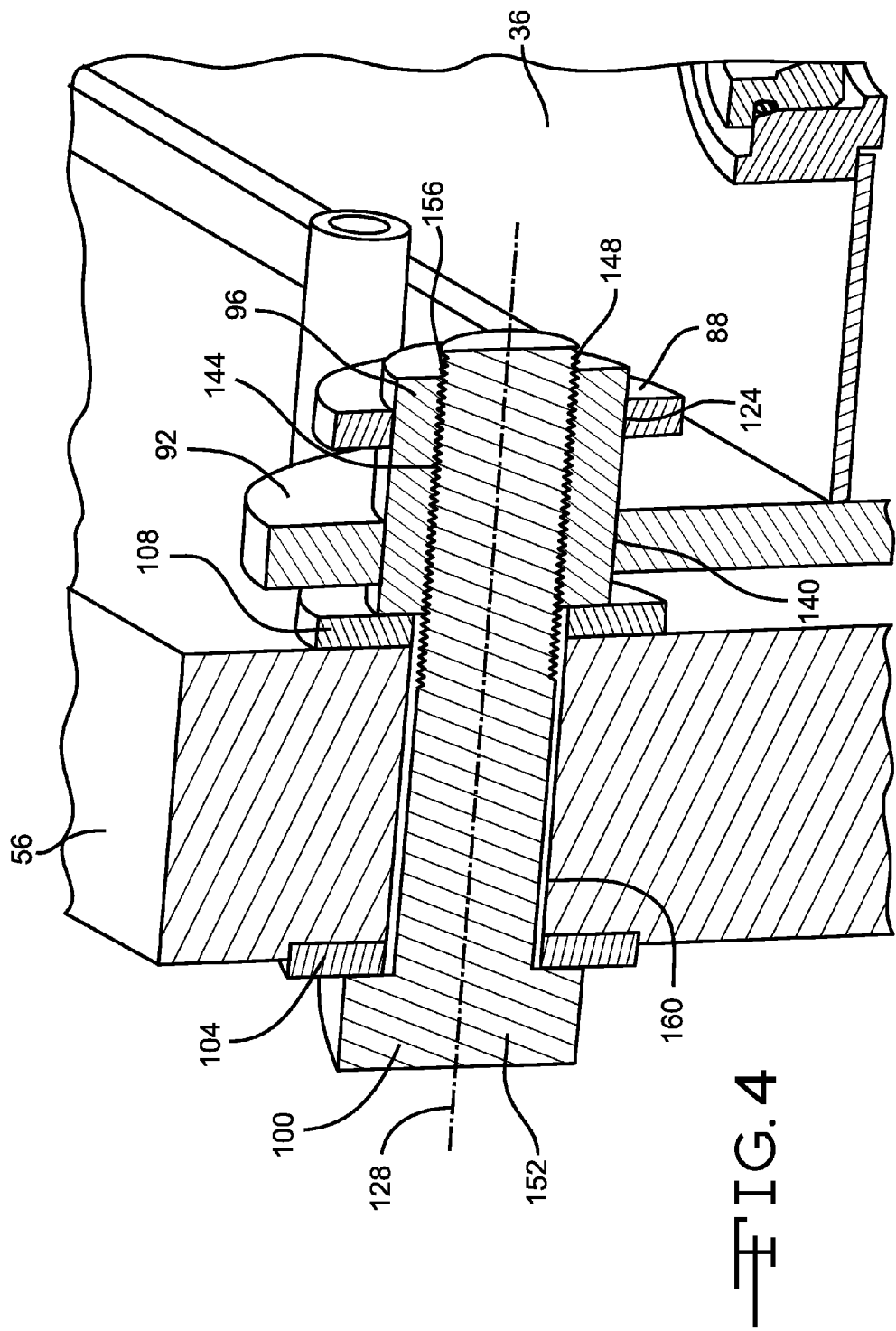

US 8,979,131 B2

FUEL TANK MOUNTING

TECHNICAL FIELD

The present disclosure relates to fuel tanks for motor vehicles and more specifically to a fuel tank mount.

BACKGROUND

Fuel tanks are mounted to motor vehicles using a variety of different mounts. Traditionally, fuel tanks have been mounted to a vehicle using one or more fixed mounts. Fixed mounts do not allow the fuel tank to move relative to the vehicle which can lead to one or more of the fixed mounts breaking or cracking when subjected to impacts or extreme forces due to the vehicle flexing over rough surfaces. Various solutions have been suggested such as U.S. Pat. No. 7,040,661 which describes a fuel tank mount assembly including a fuel tank whose front end is pivotally attached to a body frame of a vehicle by means of a hinge member.

SUMMARY

In one embodiment a fuel tank mounting system includes an end plate having a first opening, the first opening having a first axis and a tank bracket having a second opening, the second opening having a second axis. The fuel tank mounting system further includes a sleeve disposed in the first opening and the second opening, the sleeve having a third opening and the third opening having a third axis; and a pin disposed in the third opening, the pin coupling the sleeve to the end plate and the tank bracket.

Another embodiment is a method of mounting a fuel tank to a motor vehicle including providing a tank bracket having a first opening, the first opening having a first axis, the tank bracket being coupled to the fuel tank and placing the tank bracket proximate to a frame of the motor vehicle. The method also includes inserting a sleeve into the first opening, the sleeve having a second opening, the second opening having a second axis, inserting a pin into the second opening, and fixing the pin to at least one of the frame and the sleeve.

Yet another embodiment is a motor vehicle having a frame, a prime mover coupled to the frame, and a fuel tank fluidly connected to the prime mover. The motor vehicle further includes a sleeve having a first opening, the first opening having a first axis and a tank bracket coupled to the fuel tank, the tank bracket having a second opening, the second opening having a second axis. In addition the motor vehicle includes a pin having a third axis, the pin being disposed in the first opening and the second opening, the pin coupling the tank bracket to the frame.

BRIEF DESCRIPTION OF THE DRAWINGS

FIG. 4 is a cross-sectional view of the fuel tank mount shown in FIG. 3.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
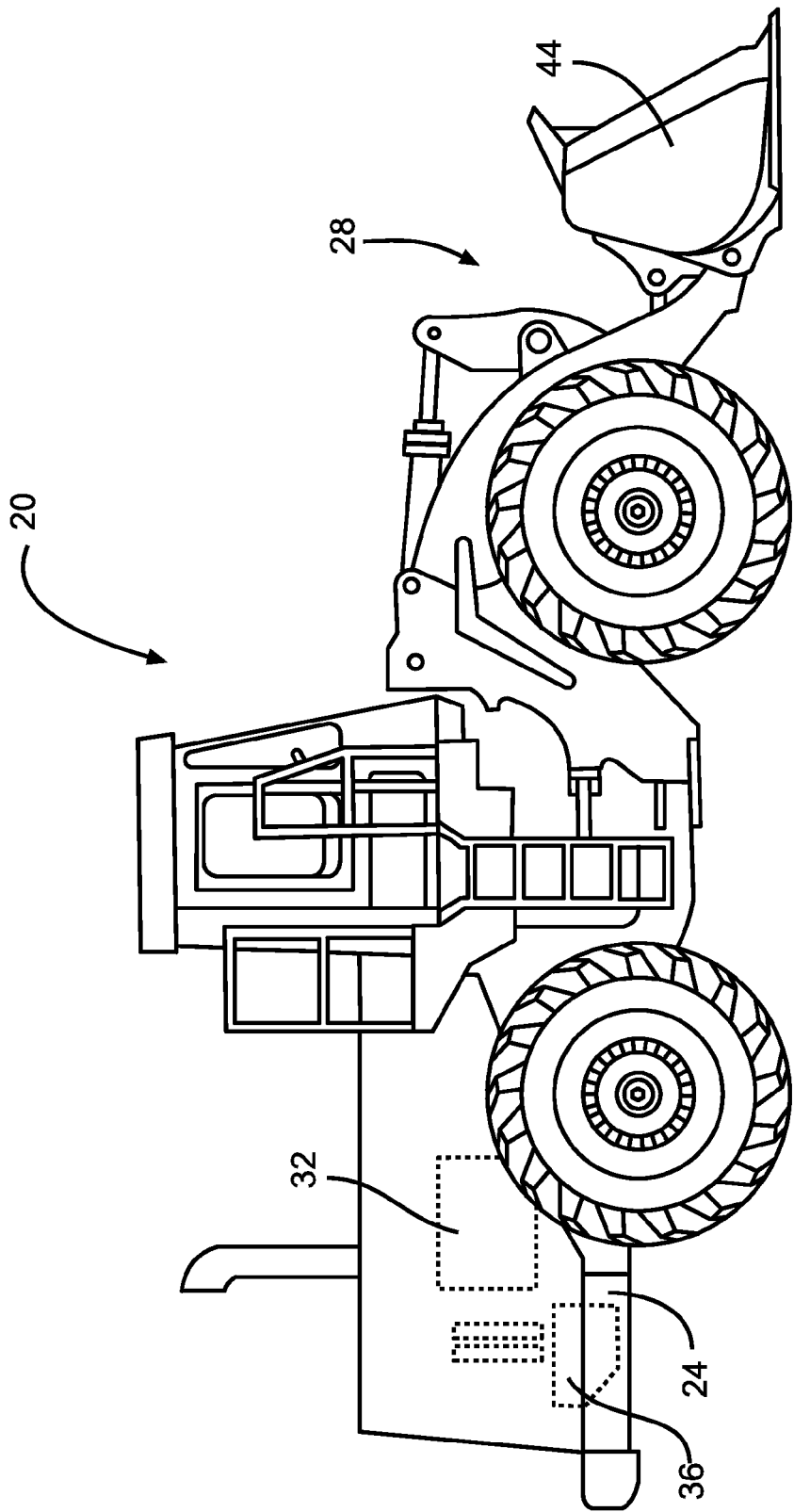
FIG. 1 is a side view of a motor vehicle having a fuel tank mounting system.

FIG. 1 illustrates a motor vehicle 20 having a frame 24, a working end 28, a prime mover 32, a fuel tank 36, and a fuel tank mounting system 40. The frame 24 may be constructed of multiple pieces which are coupled together. In other embodiments the frame 24 may be a single piece. The working end 28 in the illustrated embodiment includes a bucket 44 for scooping dirt or the like, the bucket 44 being coupled to the frame 24. The prime mover 32 in the illustrated embodiment is a diesel engine, although any internal combustion engine may be used. The prime mover 32 is coupled to the frame 24 and provides power to the vehicle 20 for moving and for operating the working end 28. The fuel tank 36 is fluidly connected to the prime mover 32 using hose, piping, or the like.

Figure 2:
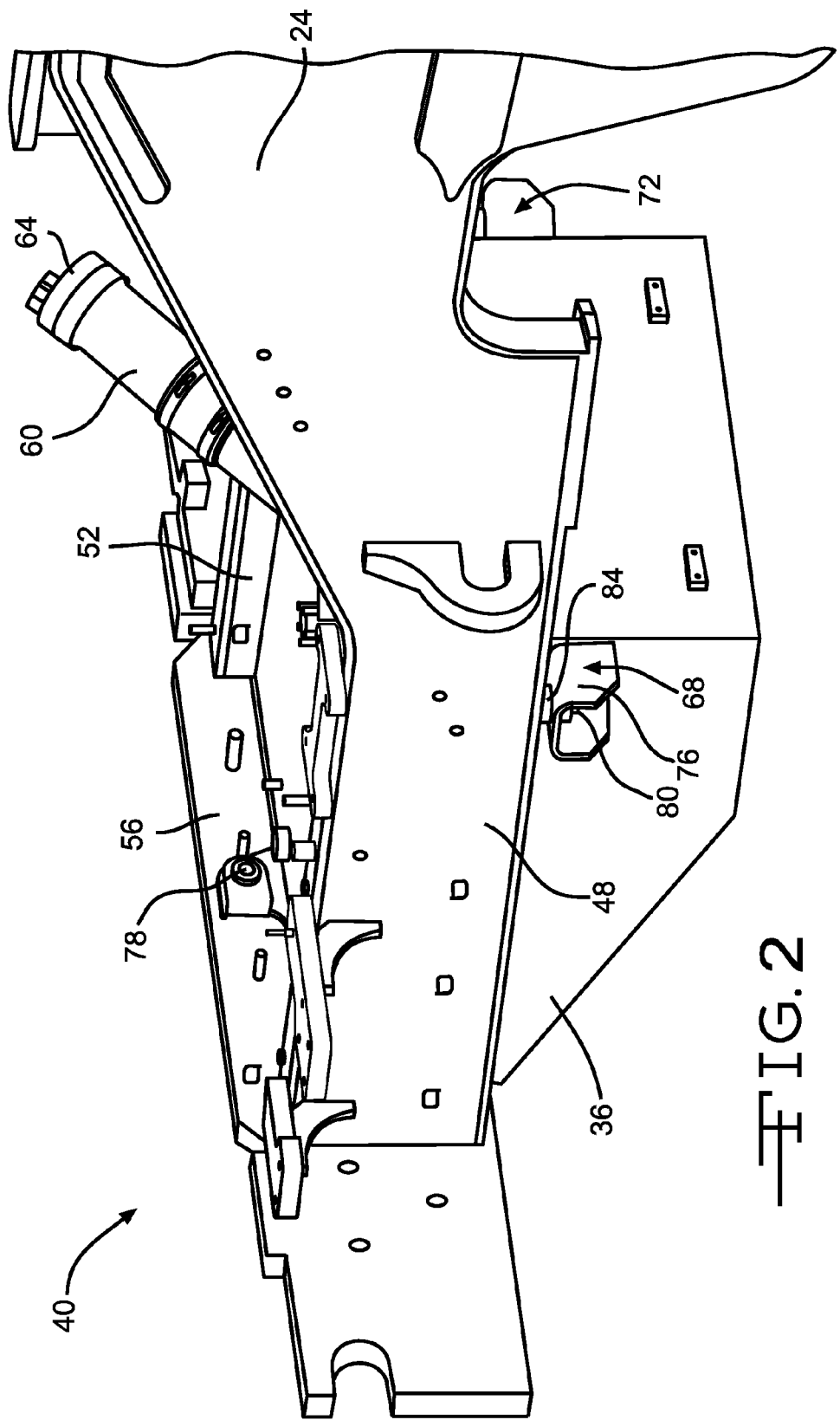
FIG. 2 is a perspective view of the fuel tank mounting system of FIG. 1.

FIG. 2 is a perspective view of a portion of the frame 24, the fuel tank 36 and the fuel tank mounting system 40. The frame 24 includes a first frame member 48 and a second frame member 52. In the illustrated embodiment a third frame member 56 is coupled to the first frame member 48 and second frame member 52. The first frame member 48, second frame member 52 and third frame member 56 may each have one or more openings disposed thereon to allow various components, such as the fuel tank mounting system 40, to be coupled to the frame 24. The first frame member 48, second frame member 52 and third frame member 56 cooperate to create a partially enclosed area. In one embodiment the fuel tank 36 is partially disposed in the enclosed area. The fuel tank 36 includes a fill neck 60 and cap 64, the fill neck 60 being coupled to the fuel tank 36 to allow for fuel to enter an interior portion of the tank 36. The fuel tank mounting system 40 includes a first isolation mount 68, a second isolation mount 72 and an end mount 78. In the illustrated embodiment the first isolation mount 68 couples the fuel tank 36 the first frame member 48, the second isolation mount 72 couples the fuel tank 36 to the second frame member 52 and the end mount 78 couples the fuel tank 36 to the third frame member 56.

The first and second isolation mounts 68, 72 are substantially similar, thus only the first isolation mount 68 will be described. The first isolation mount 68 includes a fuel tank bracket 76, a bolt 80 and one or more rubber bushings 84. The fuel tank bracket 76 may be mechanically coupled or welded to the fuel tank 36 or in some embodiments it may be integral to the fuel tank 36. The fuel tank bracket 76 has an opening thereon. The fuel tank bracket 76 is coupled to the first frame member 48 using the bolt 80. A rubber bushing 84 is placed on the bolt 80 between the fuel tank bracket 76 and the first frame member 48 to dampen vibrations that may be passed between the fuel tank 36 and the first frame member 48. In some embodiments the rubber bushing 84 may be coupled to the fuel tank bracket 76.

Figure 3:
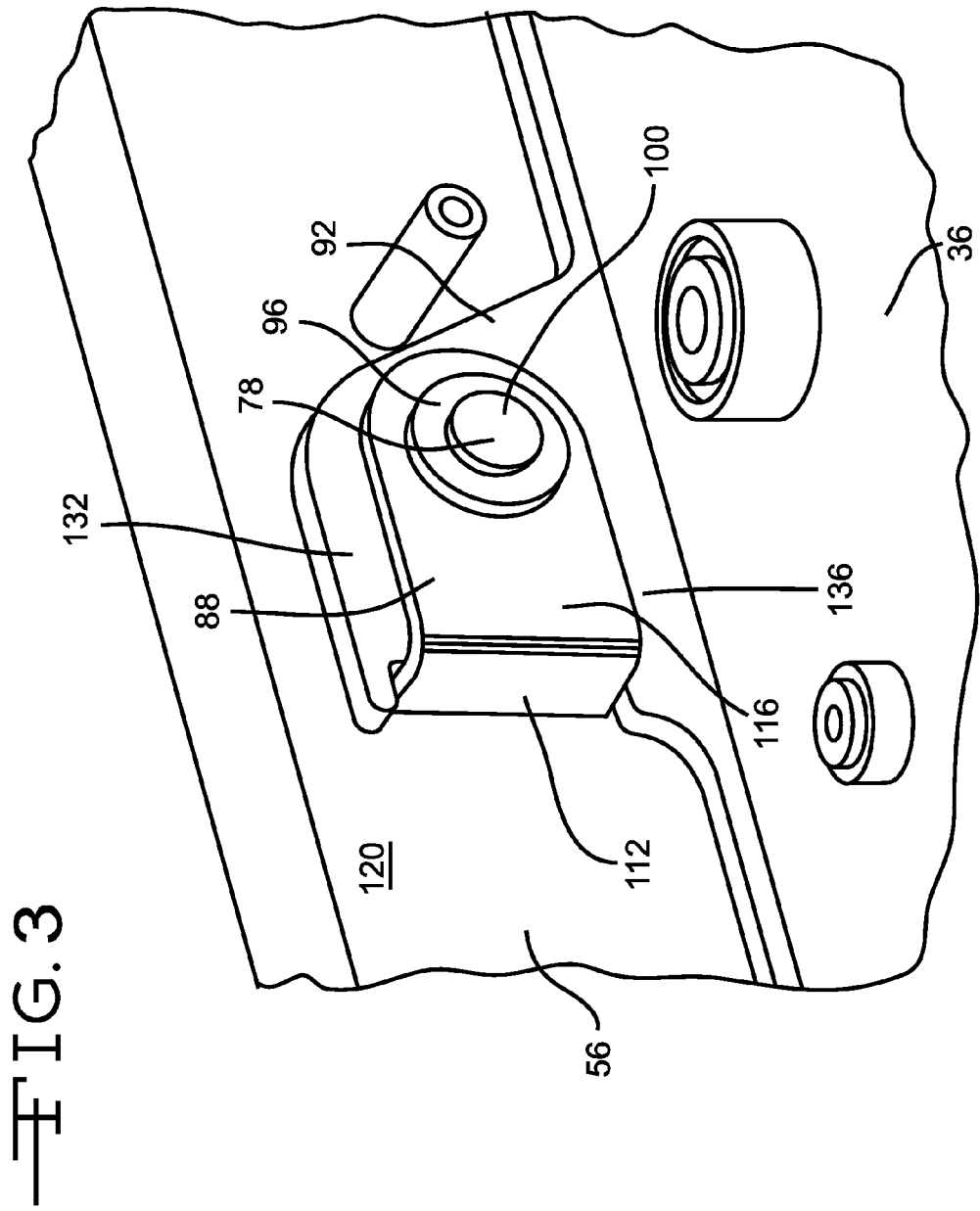
FIG. 3 is a perspective view of a fuel tank mount of the fuel tank mount system illustrated in FIG. 2.

The end mount 78 and a portion of the fuel tank 36 are shown in perspective view in FIG. 3. The end mount 78 includes an end plate 88, a c-shaped fuel tank bracket 92, a sleeve 96, a pin 100, a first washer 104 (shown in FIG. 4) and a second washer 108 (shown in FIG. 4).

As best seen in FIG. 3, the end plate 88 may be coupled to the third frame member 56 or may be an integral part of the third frame member 56. In one embodiment the end plate 88 is not coupled to the third frame member 56, but rather, just touches the third frame 56 when the fuel tank mounting system 40 is assembled. The end plate 88 includes a first portion 112 extending away from the third frame member 56 and a second portion 116 that is substantially parallel to a first surface 120 of the third frame member 56. The second portion 116 includes an opening disposed 124 thereon (illustrated in FIG. 4), the opening 124 being sized and configured to allow the sleeve 96 to pass through the opening 124. In an alternative embodiment the sleeve 96 may be welded to the end plate 88 or may be integral with the end plate 88. An axis 128 passes through the opening 124.

The c-shaped fuel tank bracket 92 is best seen in perspective view in FIG. 3. The c-shaped fuel tank bracket 92 may be coupled or welded to the fuel tank 36 or in embodiments it may be integral to the fuel tank 36. The c-shaped fuel tank bracket 92 includes an upper arm 132 and a lower arm 136, the upper arm 132 and lower arm 136 being sized and configured to allow the c-shaped fuel tank bracket 92 to interface with the end plate 88. In addition, the c-shaped fuel tank bracket 92 is of a thickness and configuration to allow it to be placed between the second portion 116 of the end plate 88 and the third frame member 56. The c-shaped fuel tank bracket 92 includes an opening 140 disposed thereon, the opening 140 being sized and configured to allow the sleeve 96 to pass through the opening 140. The axis 128 passes through the opening 140.

The sleeve 96 in the illustrated embodiment is cylindrical and hollow, forming an opening 144 therein. The exterior of the sleeve 96 is sized and configured to pass through the opening 124 of the end plate 88 and the opening 140 of the c-shaped fuel tank bracket 92. In the illustrated embodiment an interior portion of the sleeve 96 has threads 148 disposed thereon to allow the sleeve 96 to be coupled to the pin 100. The axis 128 passes through the opening 144.

In the illustrated embodiment the pin 100 is a bolt having a head 152 and a threaded portion 156. The pin 100 is sized and configured to pass into the opening 144 of the sleeve 96. In one embodiment the threads 148 of the sleeve 96 interface with the threaded portion 156, thus coupling the pin 100 to the sleeve 96. In an alternative embodiment, the pin 100 passes entirely through the sleeve 96 and nut is used to couple the pin 100 to the sleeve 96.

The first washer 104 is disposed on the pin 100 between the head 152 and the third frame member 56. In the illustrated embodiment the third frame member 56 includes a recessed area and part of the first washer 104 may reside in the recessed area. In an alternative embodiment the third frame member 56 does not include a recessed area. The second washer 108 is disposed on the pin 100 between the sleeve 96 and the third frame member 56.

In an exemplary embodiment, the fuel tank mounting system 40 provides a method of coupling the fuel tank 36 to the frame 24 of the motor vehicle 20. A first isolation mount 68 couples the fuel tank 36 to the first frame member 48. A second isolation mount 72 couples the fuel tank 36 to the second frame member 52. The c-shaped fuel tank bracket 92 is then placed between the end plate 88 and the third frame member 56. The second washer 108 is placed between the c-shaped fuel tank bracket 92 and the third frame member 56. Then the sleeve 96 is placed into the opening 124 of the end plate 88 and the opening 140 of the c-shaped fuel tank bracket 92. The first washer 104 is placed on the pin 100. The pin 100 is then inserted through an opening 160 on the third frame member 56 into the sleeve 96. In the illustrated embodiment the pin 100 is a bolt such that the threaded portion 156 engages with the threads 148 on the sleeve 96. The fuel tank 36 is thus coupled to the frame 24.

In an alternative embodiment, the fuel tank mounting system 40 provides a method of coupling the fuel tank 36 to the frame 24 of the motor vehicle 20. A first isolation mount 68 couples the fuel tank 36 to the first frame member 48. A second isolation mount 72 couples the fuel tank 36 to the second frame member 52. The c-shaped fuel tank bracket 92 is then placed proximate to the third frame member 56. The second washer 108 is placed between the c-shaped fuel tank bracket 92 and the third frame member 56. The sleeve 96 and end plate 88 are welded together, or alternatively, may be integral. Then the sleeve 96 is placed into the opening 140 of the c-shaped fuel tank bracket 92. The first washer 104 is placed on the pin 100. The pin 100 is then inserted through an opening 160 on the third frame member 56 into the sleeve 96. In the illustrated embodiment the pin 100 is a bolt such that the threaded portion 156 engages with the threads 148 on the sleeve 96. The fuel tank 36 is thus coupled to the frame 24.

As utilized herein, the terms "approximately," "about," "substantially," and similar terms are intended to have a broad meaning in harmony with the common and accepted usage by those of ordinary skill in the art to which the subject matter of this disclosure pertains.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the systems and methods for providing the crowd machinery guard as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

INDUSTRIAL APPLICABILITY

The fuel tank mounting system 40 is used to couple the fuel tank 36 to the frame 24 of the motor vehicle 20. In the illustrated embodiment the motor vehicle 20 is a wheel loader, but the fuel tank mounting system 40 may be used with other motor vehicles such as track-type tractors, articulated trucks, backhoe loaders, compactors, drills, motor graders, off-highway trucks, on-highway trucks, telehandlers, wheel excavators and passenger vehicles. The frame 24 of the motor vehicle 20 will flex or deform when the motor vehicle 20 passes over rough terrain and/or is heavily loaded, resulting in stresses on the fuel tank mounting system 40.

Prior art fuel tank mounting systems may have shorter service lives due to the stresses resulting from the frame 24 flexing or deforming In particular, prior art fuel tank mounting systems may fail due to fatigue on the fuel tank mounting system. The fuel tank mounting system 40 described herein allows the fuel tank 36 to move with respect to the frame 24 when the frame 24 flexes or deforms, thus reducing the stresses on the fuel tank mounting system 40. In particular, as the first and second frame members 48, 52 move or deform in relation to one another, the end mount 78 allows the fuel tank 36 to rotate with respect to the third frame member 56. In addition, the end mount 78 allows the fuel tank 36 to move closer to and further away (along the axis 128) from the third frame member 56. Allowing the fuel tank 36 to have some freedom of movement with respect to the third frame member 56 thus decreases stresses on the first and second isolations mounts 68, 72, thus prolonging the life of the fuel tank mounting system 40.

The fuel tank mounting system 40 protects the frame 24 and provides for ease of assembly. Stresses on the frame 24 are reduced because the fuel tank mount system 40 allows the fuel tank 36 to have some freedom of movement with respect to the frame 24, as has been described herein. The second washer 108 protects the third frame member 56 from deformations that may occur when the pin 100 is coupled to the sleeve 96. In addition, the fuel tank mounting system 40 is easy to assembly because the head 152 of the pin 100 is generally accessible making it easy to apply a wrench to the head 152. In one embodiment the upper arm 132 and lower arm 136 cooperate with the end plate 88 to inhibit rotation of the sleeve 96, thus reducing the need for a second wrench when the pin 100 is being coupled to the sleeve 96. The features described herein and other features protect the frame 24 and provide for ease in coupling the fuel tank 36 to the frame 24.

What is claimed is:

1. A fuel tank mounting system comprising: an end plate having a first opening, the first opening having a first axis; a tank bracket having a second opening, the second opening having a second axis; a sleeve disposed in the first opening and the second opening, the sleeve having a third opening, the third opening having a third axis, the tank bracket and end plate resting on the sleeve, and the tank bracket being movable relative to the third axis; and a pin disposed in the third opening, the pin being coupled to the sleeve.

2. The fuel tank mounting system of claim 1 wherein the first axis, second axis and third axis are congruent.

3. The fuel tank mounting system of claim 1 wherein the tank bracket is movable along the third axis.

4. The fuel tank mounting system of claim 1 wherein the tank bracket is rotatable about the third axis.

5. The fuel tank mounting system of claim 4 wherein the sleeve is coupled to a threaded portion of the pin.

6. The fuel tank mounting system of claim 1 wherein the sleeve is coupled to a threaded portion of the pin.

7. A method of mounting a fuel tank to a motor vehicle comprising: providing a tank bracket having a first opening, the first opening having a first axis, the tank bracket being coupled to the fuel tank; placing the tank bracket proximate to a frame of the motor vehicle; inserting a sleeve into the first opening, the sleeve having a second opening, the second opening having a second axis, and the tank bracket being movable relative to the second axis; inserting a pin into the second opening; and fixing the pin to at least one of the frame and the sleeve.

8. The method of claim 7 further comprising: providing a first fuel tank mount; and coupling the fuel tank to the frame using the first fuel tank mount.

9. The method of claim 8 further comprising: providing a second fuel tank mount; and coupling the fuel tank to the frame using the second fuel tank mount.

10. The method of claim 9 wherein the tank bracket is coupled to a third frame member of the frame, the first fuel tank mount is coupled to a first frame member of the frame, and the second fuel tank mount is coupled to a second frame member of the frame.

11. The method of claim 7 wherein the pin is inserted into the second opening and the first axis and second axis are congruent.

12. A motor vehicle comprising: a frame; a prime mover coupled to the frame; a fuel tank fluidly connected to the prime mover; a sleeve having a first opening, the first opening having a first axis; a tank bracket coupled to the fuel tank, the tank bracket having a second opening, the second opening having a second axis; a pin disposed in the first opening and the second opening, the pin having a third axis, the pin coupling the tank bracket to the frame, and the tank bracket being movable relative to the second axis.

13. The motor vehicle of claim 12 wherein the first axis, second axis and third axis are congruent.

14. The motor vehicle of claim 12 wherein the tank bracket is movable along the second axis.

15. The motor vehicle of claim 12 wherein the tank bracket is rotatable about the second axis.

16. The motor vehicle of claim 12 further comprising a first fuel tank mount coupled to the fuel tank and the frame.

17. The motor vehicle of claim 16 further comprising a second fuel tank mount coupled to the fuel tank and the frame.

18. The motor vehicle of claim 17 wherein the first fuel tank mount and second fuel tank mount are isolation mounts.

19. The motor vehicle of claim 12 further comprising an end plate, the end plate being coupled to the sleeve and wherein the end plate inhibits movement of the tank bracket along the first axis.

20. The motor vehicle of claim 19 wherein the pin is coupled to the sleeve using threads.

* * * * *